6783X
W. Woolley,
Sofa Bedstead,
Patented Oct. 3, 1831.
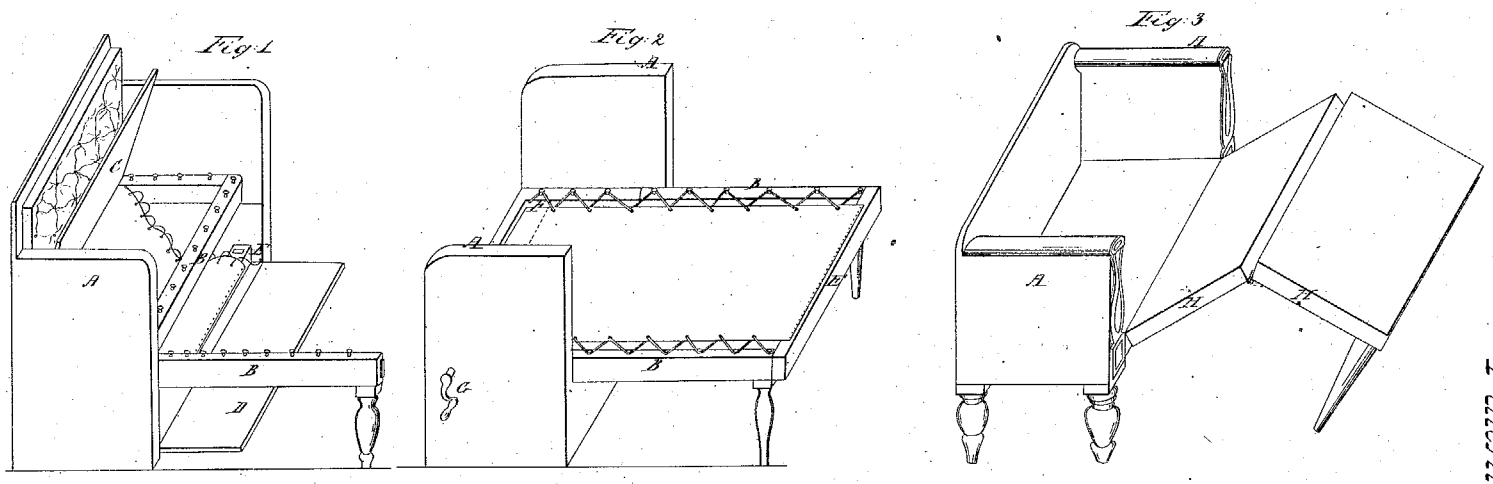
N. PETERS, PHOTO-LITHOGRAPHER, WASHINGTON, D. C.

67837X Oct, 3, 1831

Williams Woolley of New York City

Letters Patent

The Schedule referred to in these Letters Patent and making part of the same containing a description in the words of the said Williams Woolley himself, of his improvement in the construction of "Secret Bedstead" for Sofas or Settees To all whom these presents shall come. Be it known that I Williams Woolley of the City County and State of New York have invented a new and useful improvement in the construction of Secret Bedsteads for Sofas or Settees. and that the following is a full and exact description of said improvement as Invented by me.

The new principle as herein claimed by the subscriber may be adapted to Sofas or Settees as follows. The bedstead may be either extended from the front, the back, or may be drawn out from the top of the Sofa. in the latter case the Seat and cushion form part of the Bedstead.

The ground work of the principles is the same as already secured to the subscriber in a former Patent. The Sofa or Settee. where the bedstead is extended from the front must have its seat secured by hinges at back. for raising to a vertical position. when the Bedstead is extended; the front part is also supplied with hinges, and is to be let down before the Bedstead can be drawn out.

The Secret Bedstead consists of two arms. each secured by a pivot or finger joint. to opposite ends of the Sofa, and within it. These arms may be made of wood or other suitable substance, and extend out at right angles from the Sofa, at the required length, having moveable legs, or supports at their extremities which rest on the floor. The sacking is secured at one side to a cross-bar which fits over the projecting ends of the arms. having mortises or other contrivance for that purpose. The other side of the sacking is attached to a frame or leaf moving on the same principle as for the Counter Bedstead — (Patented by the subscriber. May 1830) This leaf serves to stretch the sacking) which is also tightened by loops or cords which pass over knobs placed on the arms for that purpose. Where the Bedstead is to be extended from the back of the Sofa. it consists of arms attached as before mentioned, having a cross Bar

[illegible]

180 6783X fitting over their ends to which one side of the sacking is attached the same as for the front. The inner side of the sacking is fastened to a horizontal shaft, hung by gudgeons, and passing longitudinally through the body of the Sofa. It is supplied with a crank for winding the bed in the body of the Sofa. The sacking is secured at the ends by cords or loops which pass over knobs on the arms for that purpose. There is also a moveable bar which fits between the arms near the Sofa having gudgeons or tenons to interact mortises in the arms for that purpose. This bar serves as a rest or support to one side of the sacking when unwound from the shaft. It is slipped out when the Bed &c is wound up. The arms are then closed in and the whole hid from sight by the head Board, made to answer the purpose of a door [illegible]

The seat in this case is attached by hinges to one of the leaves, but folds at opposite angles from them. The seat when drawn out horizontally from the Sofa, extends the leaves also which are folded under it, and to one of which it is attached, thus forming one third of the width of the Bedstead. The sacking is stretched across the leaves and tightened by a regulating pin at the back. The Subscriber claims the privilege of constructing his secret Bedsteads of wood, or any suitable metal.

The superiority of these Bedsteads over all others, is that the Beds & Bedding are enclosed in a tight box which effectually excludes all dust and air necessary to the existence of insects.

Exd. Witnesses
MGC. W. P. Blagrove.
H. C. Hutchinson

Williams Woolley (728 words)

(Patented 3rd Oct 1831)